United States Patent
Goldstein

(10) Patent No.: US 11,415,328 B2
(45) Date of Patent: Aug. 16, 2022

(54) FACADE PANEL CONDITIONING SYSTEM

(71) Applicant: David J. Goldstein, Long Island City, NY (US)

(72) Inventor: David J. Goldstein, Long Island City, NY (US)

( * ) Notice: Subject to any disclaimer, the term of this patent is extended or adjusted under 35 U.S.C. 154(b) by 9 days.

(21) Appl. No.: 17/162,598

(22) Filed: Jan. 29, 2021

(65) Prior Publication Data

US 2021/0247077 A1 Aug. 12, 2021

Related U.S. Application Data

(60) Provisional application No. 62/972,744, filed on Feb. 11, 2020.

(51) Int. Cl.
*F24F 1/0057* (2019.01)
*F24F 5/00* (2006.01)
(Continued)

(52) U.S. Cl.
CPC .......... *F24F 1/0057* (2019.02); *E04B 1/7629* (2013.01); *E04B 1/7645* (2013.01);
(Continued)

(58) Field of Classification Search
CPC ................... F24F 1/0057; F24F 5/0075; F24F 2005/0082; F24F 2221/17; F24F 2221/50;
(Continued)

(56) References Cited

U.S. PATENT DOCUMENTS 4,296,798 A   10/1981  Schramm
4,593,511 A *  6/1986  Hakasaari ............... E04F 13/10
                                                 52/794.1
(Continued)

FOREIGN PATENT DOCUMENTS

DE   2932628 A1    2/1981
DE   19521414 A1 * 12/1996  ............... E04B 5/48
(Continued)

OTHER PUBLICATIONS

Written Opinion of the International Searching Authority for PCT/US2021/016026 established by the ISA/US completed on Apr. 26, 2021.
(Continued)

*Primary Examiner* — Brent W Herring
(74) *Attorney, Agent, or Firm* — Goldstein Law Offices, P.C.

(57) ABSTRACT

A facade panel conditioning system for installation on a new or existing building is disclosed. The system includes modular panels, a structural anchor, hydronic piping, and ductwork. The panels attach to each other around the exterior of the building forming an insulated shell. The anchor attaches the panels to the building structure forming an air cavity between each individual panel and the exterior. The hydronic piping transfers heat to the air cavity and individual units of the building. The ductwork delivers ventilated air and exhaust air to the air cavity and individual units. The hydronic piping of a panel connects to the hydronic piping of an adjacent panel forming a hydronic piping system that distributes heat or cool throughout the shell. The air duct of a panel connects to the air duct of an adjacent panel forming an air duct ventilation system that distributes air throughout the shell.

15 Claims, 12 Drawing Sheets

(51) Int. Cl.
*E04B 1/76* (2006.01)
*E06B 3/66* (2006.01)
*E04F 13/072* (2006.01)
*E04F 13/00* (2006.01)
*E04B 2/88* (2006.01)
*E04F 13/08* (2006.01)

(52) U.S. Cl.
CPC .............. *E04B 2/88* (2013.01); *E04F 13/007* (2013.01); *E04F 13/072* (2013.01); *E06B 3/66* (2013.01); *F24F 5/0075* (2013.01); *E04F 13/0833* (2013.01); *E04F 13/0869* (2013.01); *E04F 2290/023* (2013.01); *F24F 2005/0082* (2013.01); *F24F 2221/17* (2013.01); *F24F 2221/20* (2013.01); *F24F 2221/50* (2013.01); *Y02B 30/00* (2013.01)

(58) Field of Classification Search
CPC ...... F24F 5/0089; F24F 13/18; F24F 2221/20; E04B 1/7629; E04B 1/7645; E04B 2/88; E04B 1/76; E04B 1/762; E04B 2/90; E04F 13/007; E04F 13/072; E04F 13/0833; E04F 13/0869; E04F 2290/023; E06B 3/66; Y02B 30/00
USPC ...... 454/203; 62/262, 263; 165/47, 48.1, 49, 165/53, 54; 52/506.01, 220.1, 220.3, 52/173.1, 198
See application file for complete search history.

(56) References Cited

U.S. PATENT DOCUMENTS

| | | | |
|---|---|---|---|
| 5,347,779 A * | 9/1994 | Jordan | F24S 20/66 52/235 |
| 5,497,826 A | 3/1996 | Ingram | |
| 5,566,525 A | 10/1996 | Schwarz | |
| 6,754,997 B2 | 6/2004 | Bonin | |
| 6,805,298 B1 | 10/2004 | Corbett | |
| 6,860,073 B2 | 3/2005 | Chien | |
| 8,621,787 B2 | 1/2014 | Barry et al. | |
| 8,978,324 B2 | 3/2015 | Collins et al. | |
| 9,182,133 B1 | 11/2015 | Weber | |
| 9,273,463 B1 * | 3/2016 | Kossman | F24F 11/30 |
| 9,382,706 B2 | 7/2016 | Warren | |
| 2004/0154245 A1 | 8/2004 | Chien | |
| 2005/0040152 A1 * | 2/2005 | Koschenz | F24D 3/165 392/339 |
| 2013/0180191 A1 | 7/2013 | Teran | |
| 2015/0284944 A1 | 10/2015 | Warren | |
| 2016/0186431 A1 * | 6/2016 | Schluter | E04B 5/17 52/302.1 |
| 2017/0254550 A1 * | 9/2017 | Poccianti | E04B 1/7612 |
| 2019/0093356 A1 | 3/2019 | Collins et al. | |
| 2019/0301156 A1 | 10/2019 | Sandefur | |
| 2020/0232663 A1 * | 7/2020 | Buff | F24D 3/148 |
| 2020/0392738 A1 * | 12/2020 | Passon | E04F 13/0835 |
| 2021/0108825 A1 * | 4/2021 | Roj | E04G 23/0296 |

FOREIGN PATENT DOCUMENTS

| | | | | |
|---|---|---|---|---|
| FR | 2866040 A1 * | 8/2005 | ............... | E04B 1/14 |
| WO | WO-2004106811 A1 * | 12/2004 | ............... | E06B 7/10 |
| WO | 2013/121044 A1 | 8/2013 | | |
| WO | WO-2016000089 A1 * | 1/2016 | ............... | E06B 7/28 |
| WO | WO-2017156016 A1 * | 9/2017 | ......... | E04B 1/34321 |

OTHER PUBLICATIONS

International Preliminary Report on Patentability of the International Preliminary Examining Authority for PCT/US2021/016026 established by the IPEA/US completed on Dec. 15, 2021.

* cited by examiner

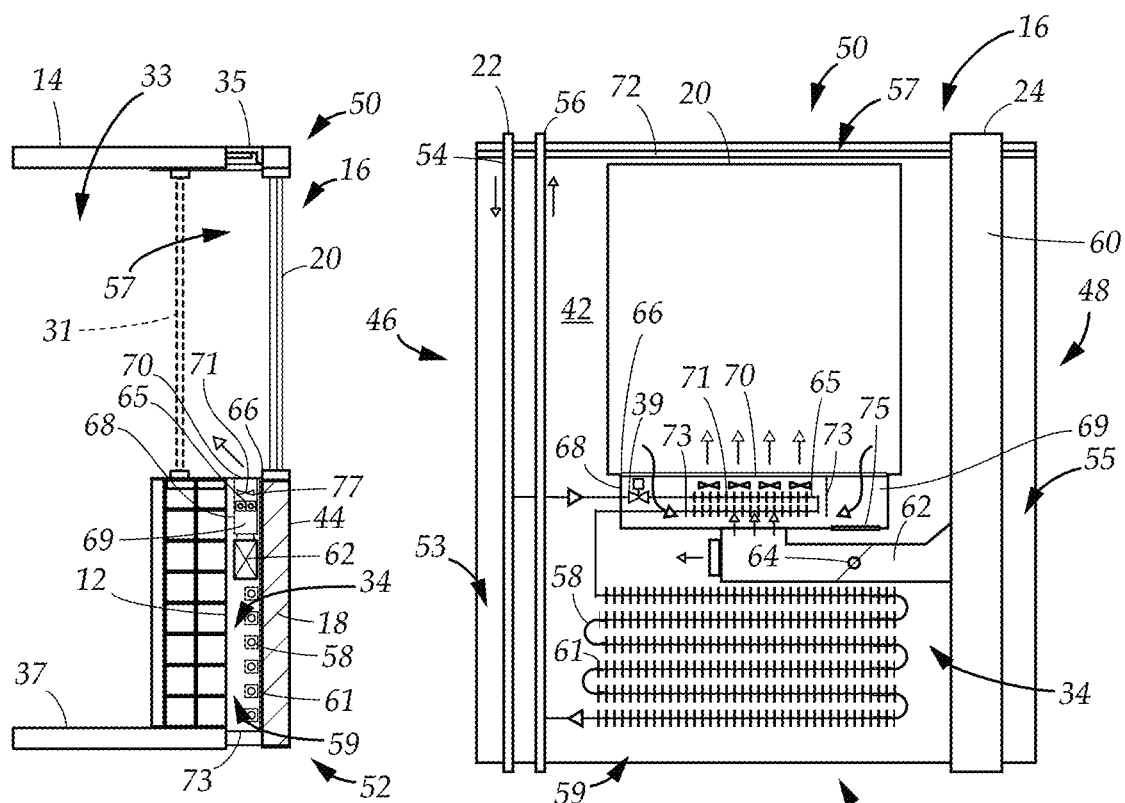
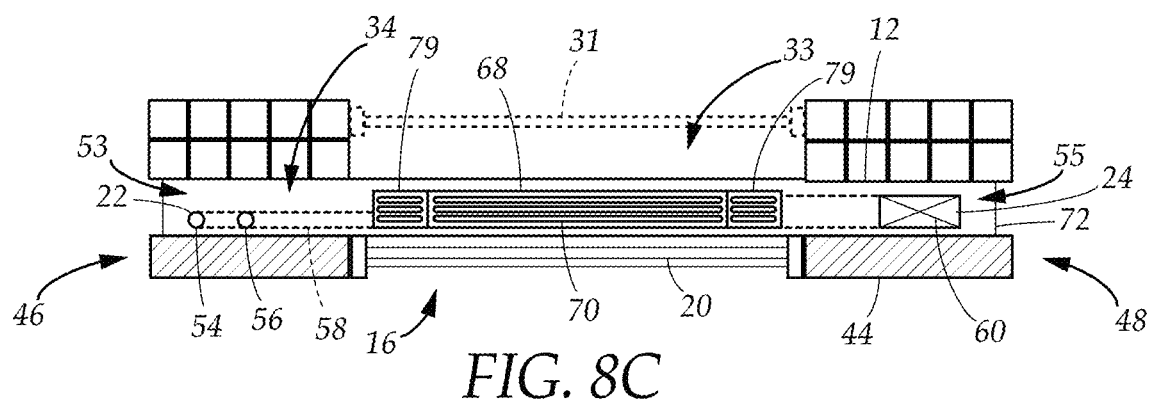

FACADE PANEL CONDITIONING SYSTEM

CROSS-REFERENCE TO RELATED APPLICATIONS

This application claims the benefit of priority of U.S. Provisional Patent Application Ser. No. 62/972,744, filed on Feb. 11, 2020, the contents of which are relied upon and incorporated herein by reference in their entirety.

TECHNICAL FIELD

The present disclosure relates generally to facade panel systems. More particularly, the present disclosure relates to an insulated facade panel conditioning system including modular panels configured for installation on new or existing buildings such as multifamily residential buildings, condominiums, hotels, or dormitories to create an insulated shell therearound. The insulated facade panel conditioning system includes integrated heating, ventilation, and air conditioning (HVAC) piping and ductwork within each modular panel that distributes highly efficient heating and cooling to individual units within these buildings.

BACKGROUND

Buildings are a major contributor to global energy consumption and greenhouse gas emissions. There is urgent need to reduce these emissions especially within the older existing building stock, such as multifamily residential apartment buildings and condominiums. By way of example, New York City has passed the Climate Mobilization Act, which requires that large buildings comply with emissions limits. However, the industry currently lacks a comprehensive and cost-effective method of implementing retrofits to existing buildings that drives them towards net-zero energy consumption. Moreover, because a significant portion of existing buildings are older, they are in much need of revitalization to their appearance and infrastructure.

Accordingly, there is a need for a facade panel conditioning system that provides a new cost-effective approach to greatly reducing energy consumption and greenhouse gas emissions while minimizing disruption to existing tenants and/or occupants. Moreover, there is a need for a facade panel conditioning system that once installed provides the additional benefits of an updated HVAC infrastructure offering improved comfort and air quality and simplified operation and maintenance, as well as a new facade appearance that revitalizes our existing buildings and neighborhoods.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a facade panel conditioning system capable of being installed on a new or existing building. Accordingly, the present disclosure provides a facade panel conditioning system comprising modular panels including connection anchors that connect to the structure of a building.

An aspect of an example embodiment in the present disclosure is to provide a facade panel conditioning system capable of being installed on a new or existing building and creates an insulated shell around the building. Accordingly, the present disclosure provides a facade panel conditioning system comprising modular panels that connect to one another over the exterior of a building in an airtight, watertight, and vapor-tight fashion.

An aspect of an example embodiment in the present disclosure is to provide a facade panel conditioning system that eliminates the need for the combustion of fossil fuels, thereby reducing greenhouse gas emissions. Accordingly, the present disclosure provides a facade panel conditioning system including an HVAC system that is powered by electricity and/or integrates with a building's electrical infrastructure.

An aspect of an example embodiment in the present disclosure is to provide a facade panel conditioning system that reduces the heating and cooling loads required to heat and cool new or existing buildings, thereby making the building more energy efficient. Accordingly, the present disclosure provides a facade panel conditioning system including high-performance insulated modular panels that in combination increase the R-value of the insulation of the new or existing building, thereby requiring a smaller HVAC system/piping and ductwork to heat and cool the building efficiently.

An aspect of an example embodiment in the present disclosure is to provide a facade panel conditioning system that enables the addition or installation of new HVAC piping and ductwork to the infrastructure of a new or existing building. Accordingly, the present disclosure provides a facade panel conditioning system including modular panels that are configured to create an air cavity between the modular panel and the facade of the building once installed, so as to enable new HVAC piping and ductwork to be positioned in the air cavity and distribute heating or cooling water and air thereto.

An aspect of an example embodiment in the present disclosure is to provide a facade panel conditioning system capable of distributing heat, cooling, and ventilation to each individual unit of a new or existing building. Accordingly, the present disclosure provides a facade panel conditioning system including a modular panel including HVAC piping and ductwork circulation units, which distribute heating, cooling, and ventilation to the individual units of the building.

An aspect of an example embodiment in the present disclosure is to provide a facade panel conditioning system capable of distributing heat, cooling, and ventilated air throughout the entirety of a new or existing building. Accordingly, the present disclosure provides a facade panel conditioning system including modular panels that have HVAC piping and ductwork that is connectable between each modular panel, thereby enabling the distribution of heating, cooling, and ventilated air throughout the building once the facade panel conditioning system is installed over the building.

An aspect of an example embodiment in the present disclosure is to provide a facade panel conditioning system that once installed over a new or existing building prevents the migration of air, fire, and smoke horizontally or vertically from the air cavity of a modular panel to the air cavity of an adjacent modular panel. Accordingly, the present disclosure provides a facade panel conditioning system including isolation baffles separating the air cavities and HVAC piping and ductwork of adjacent modular panels.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 8A is a vertical cross-sectional view of a modular panel of the facade system attached to the exterior of a building, illustrating the configuration of the components of the modular panel with respect to the exterior of a building when the modular panel is attached to the exterior of the building according to one embodiment of the present disclosure.

FIG. 8B is an elevation view of an interior of a modular panel of the facade panel conditioning system, illustrating the configuration of the components of the modular panel according to one embodiment of the present disclosure.

FIG. 8C is a horizontal cross-sectional view of the modular panel of the facade panel conditioning system attached to the exterior of a building, illustrating the configuration of the components of the modular panel within the air cavity, which is formed between the modular panel and the exterior of a building when the modular panel is attached to the exterior of the building according to one embodiment of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION

Figure 1:
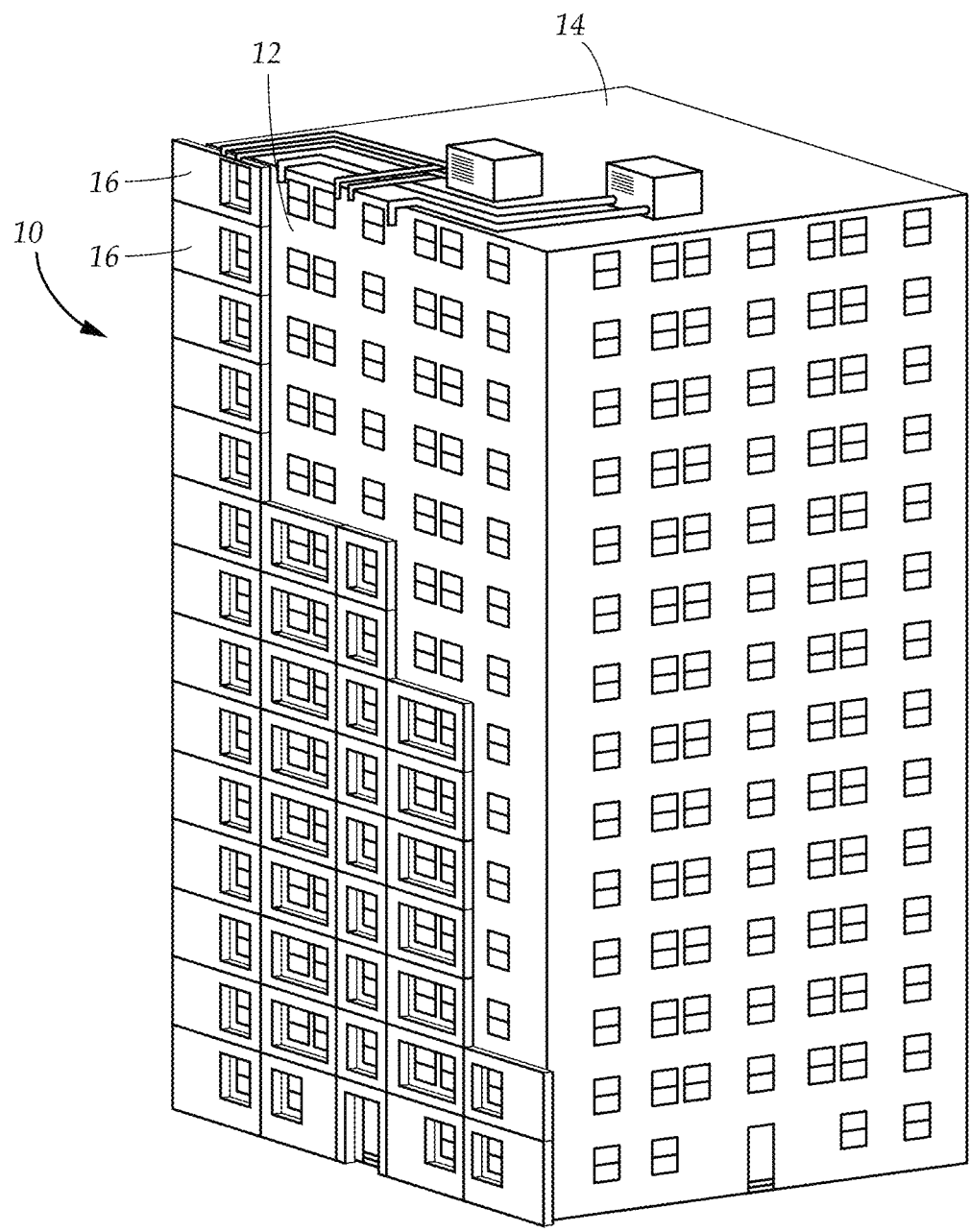
FIG. 1 is a perspective view of the facade panel conditioning system partially installed over the exterior of a building, illustrating the modular installation of the facade panel conditioning system according to one embodiment of the present disclosure.

FIG. 1 illustrates a facade panel conditioning system 10 for installation on the exterior 12 of a new or existing building 14, such as a new construction or an existing multifamily residential building, condominium, hotel, or dormitory. The facade panel conditioning system 10 includes a plurality of modular panels 16 that are each configured to attach to the structure of the building 14 as well as modularly attach to one another over the exterior 12 of the building 14. The exterior 12 of the building 14 includes portions that correspond to the individual units within the building 14. The plurality of modular panels 16 are configured to attach to and cover these portions of the exterior 12 such that each of the plurality of modular panels 16 corresponds to an individual unit of the building 14. When attached to the facade and to one another over the exterior 12, the plurality of modular panels 16 form an insulated shell around the building 14 that encloses or envelopes the exterior 12.

In embodiments, each of the modular panels of the plurality of panels 16 is fabricated to include the same dimension as the interior wall of the individual unit, such that a modular panel attached to the exterior 12 spans or is coextensive with the interior wall of the individual unit of the building 14. In some embodiments, the facade panel conditioning system 10 comprises a gasket or sealant (not shown) configured to seal the plurality of modular panels 16 to one another when attached to the building 14. The sealant creates an airtight and watertight seal between an interior of the plurality of modular panels 16 and an exterior of the plurality of modular panels 16, thereby making the insulated shell around the building airtight and watertight.

Figure 2:
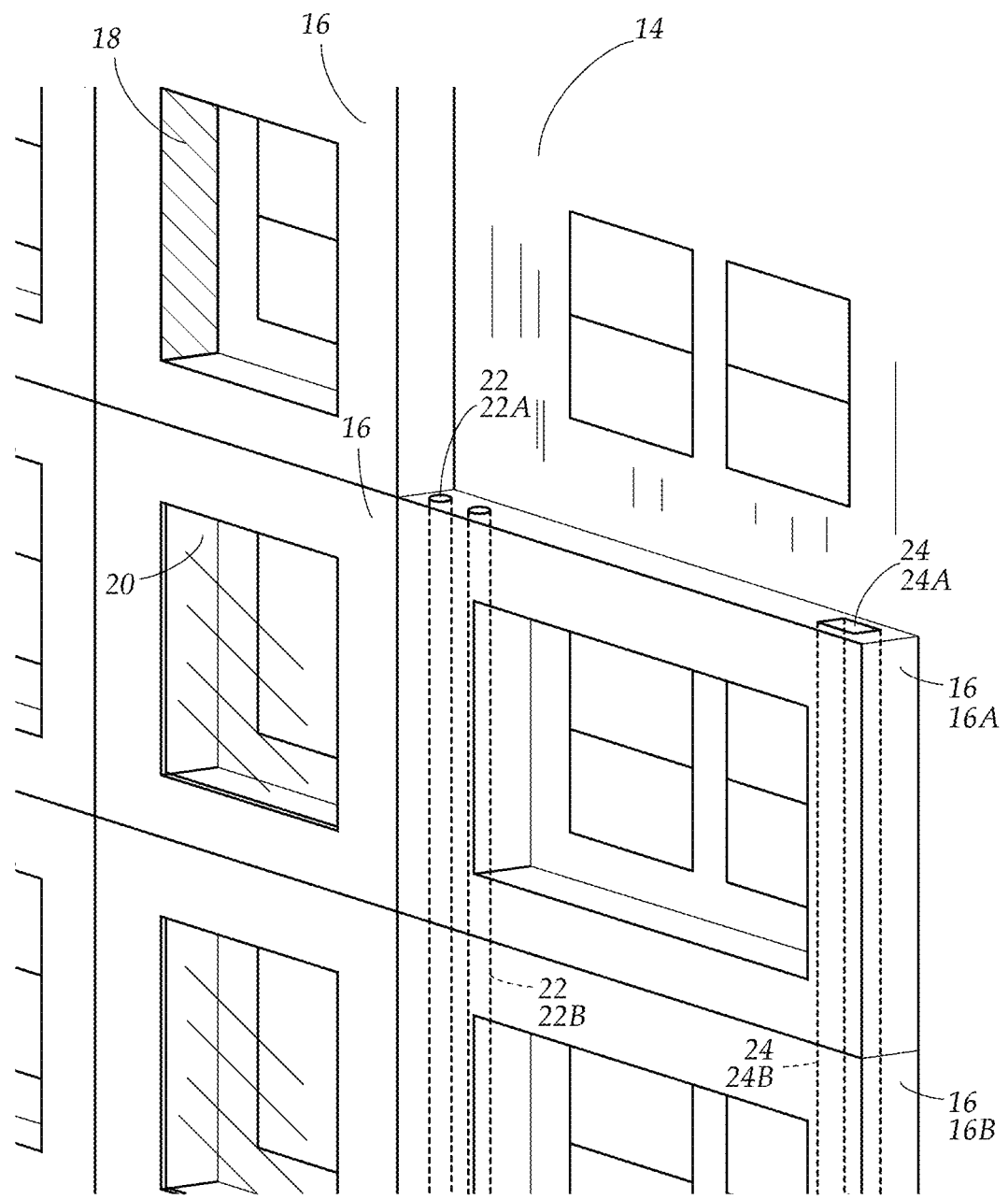
FIG. 2 is a perspective close-up and partial phantom view of the facade panel conditioning system partially installed over the exterior of a building, illustrating the configuration of the HVAC piping and ductwork of the facade panel conditioning system within each modular panel and the interconnection of the HVAC piping and ductwork after installation of the modular panels according to one embodiment of the present disclosure.

Referring now to FIG. 2, each of the plurality of modular panels 16 comprises insulation 18, a window assembly 20, hydronic piping 22, and an air duct 24. The hydronic piping 22A of a modular panel 16A of the plurality of modular panels 16 connects to the hydronic piping 22B of an adjacent modular panel 16B of the plurality of modular panels 16. In embodiments, the adjacent modular panel 16B is a modular panel attached to the individual unit of the building 14 that is immediately above the individual unit of the building to which the modular panel 16A has been attached. In embodiments, the hydronic piping 22A of modular panel 16A attaches to the hydronic piping 22B of adjacent modular panel 16B after the plurality of modular panels 16 are attached to the structure of the building 14. In embodiments, the hydronic piping 22A of modular panel 16A attaches to the hydronic piping 22B of adjacent modular panel 16B before the plurality of modular panels 16 are attached to the structure of the building 14. In embodiments, the hydronic piping 22A of modular panel 16A attaches to the hydronic piping 22B of adjacent modular panel 16B after the plurality of modular panels 16 are attached to the structure of the building 14 but before the plurality of modular panels 16 are sealed.

The air duct 24A of modular panel 16A connects to the air duct 24B of an adjacent modular panel 16B. In embodiments, the air duct 24A of modular panel 16A attaches to the air duct 24B of adjacent modular panel 16B after the plurality of modular panels 16 are attached to the structure of the building 14. In some embodiments, the air duct 24A of modular panel 16A attaches to the air duct 24B of adjacent modular panel 16B before the plurality of modular panels 16 are attached to the structure of the building 14. In other embodiments, the air duct 24A of modular panel 16A attaches to the air duct 24B of adjacent modular panel 16B after the plurality of modular panels 16 are attached to the structure of the building 14 but before the plurality of modular panels 16 are sealed.

Figure 3:
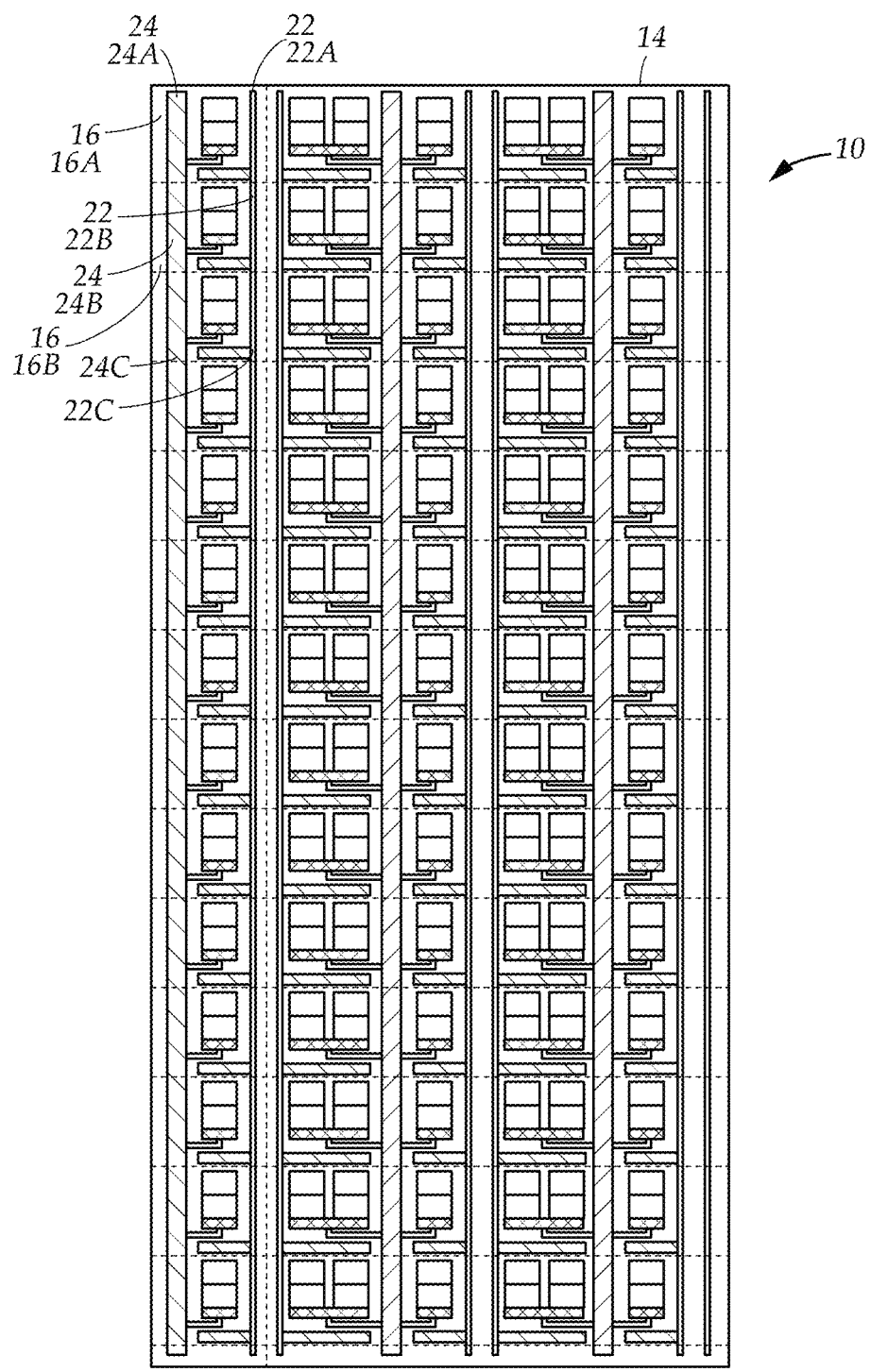
FIG. 3 is an elevation view of the interior of the modular panels of the facade panel conditioning system after full installation of the facade panel conditioning system on a building, illustrating the distribution of the HVAC piping and ductwork of the facade panel conditioning system throughout the building and to the individual units of the building according to one embodiment of the present disclosure.

Referring now to FIG. 3, the hydronic piping 22A, 22B of the modular panels 16A, 16B attach to one another to form a hydronic piping system 22C that distributes heating or cooling water throughout the insulated shell and building 14. In embodiments, the hydronic piping system 22C extends vertically through the facade panel conditioning system 10. The hydronic piping system 22C comprises a network of hydronic piping formed from the interconnection of the hydronic pipping 22 of adjacent modular panels 16.

The air ducts 24A, 24B of the modular panels 16A, 16B attach to one another to form an air duct ventilation system 24C that distributes air throughout the insulated shell and building 14. In embodiments, the air duct ventilation system 24C extends vertically through the facade panel conditioning system 10. The air duct ventilation system 24C comprises a network of air ducts formed from the interconnection of the air ducts 24 of adjacent modular panels 16.

Figure 4:
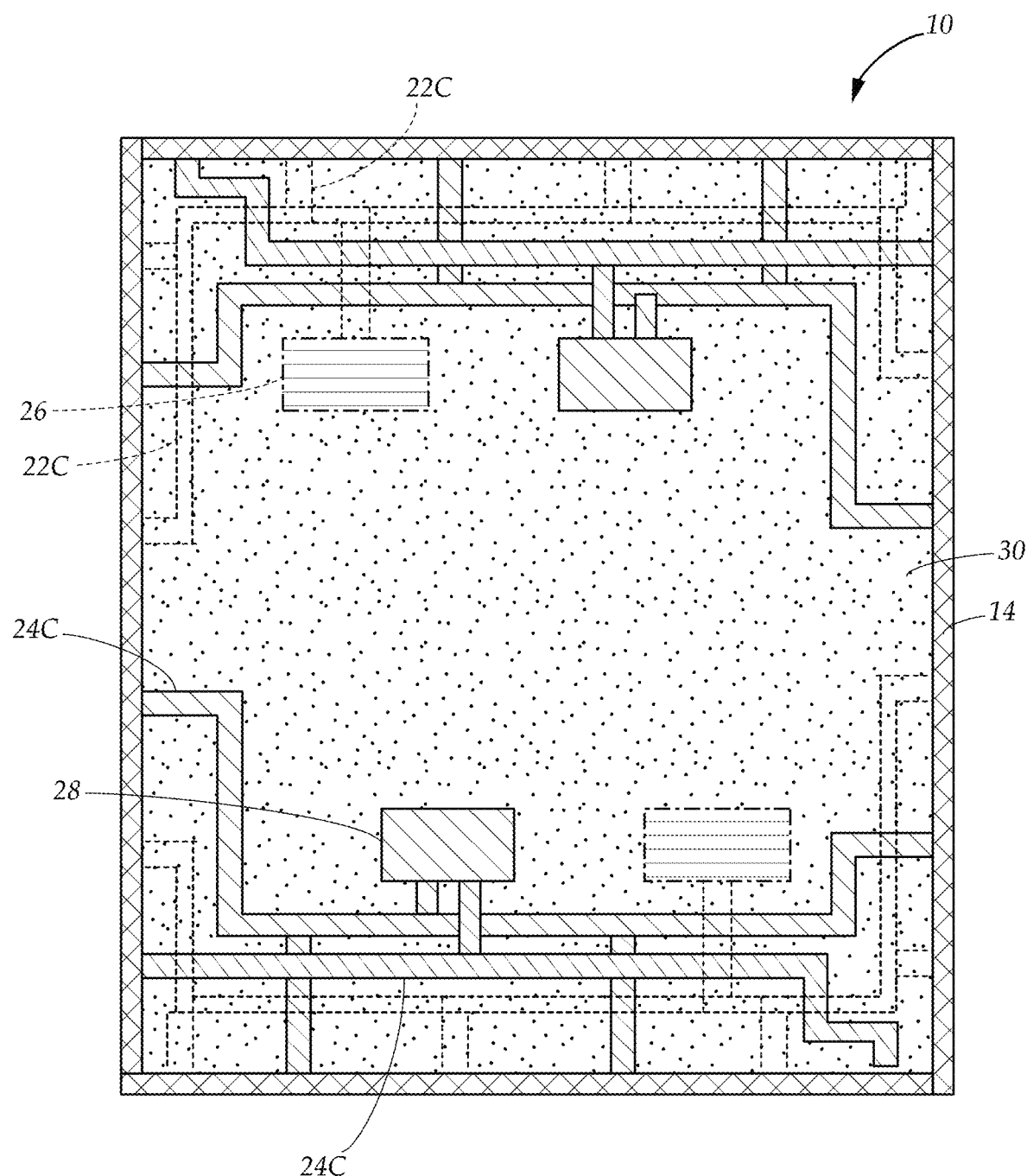
FIG. 4 is a plan view of the roof of a building in which the facade panel conditioning system has been fully installed on a building, illustrating the HVAC plant and the distribution of the HVAC piping and ductwork on the roof according to one embodiment of the present disclosure.

Referring now to FIG. 4, the facade panel conditioning system 10 comprises a hydronic heat pump system 26 to operate the hydronic piping system 22C. In embodiments, the hydronic heat pump system 26 is connected to the hydronic piping system 22C at the roof 30 of the building 14. In some embodiments, the hydronic heat pump system 26 is retrofit, installed, or attached to the roof 30 of the building 14 such that it is attached exteriorly to the building 14. The hydronic heat pump system 26 may also be installed within the interior of the building 14 as such as in a mechanical or utility room. The hydronic heat pump system 26 is electric thereby eliminating the combustion of fossil fuels for heating and cooling. In operation, heated and chilled water provided to the hydronic piping system 22C is generated by the hydronic heat pump system 26. The hydronic heat pump system 26 may comprise air or water-source heat pumps and distribution pumps. In one embodiment, the hydronic heat pump system 26 is factory assembled for delivery to the project site in a single module. The water temperatures required to provide heating and cooling throughout the insulated shell are moderate, allowing for extremely efficient operation of the hydronic heat pump system 26 throughout the year.

In embodiments, the facade panel conditioning system 10 comprises a ventilation air handling unit 28 to operate the air duct ventilation system 24C. In embodiments, the ventilation air handling unit 28 is connected to the air duct ventilation system 24C at the roof 30 of the building 14. In some embodiments, the ventilation air handling unit 28 is retrofit, installed, or attached to the roof 30 of the building 14 such that it is disposed exteriorly to the building 14. The ventilation air handling unit 28 may also be installed within the interior of the building 14 as such as in a mechanical or utility room.

In operation, the ventilation air handling unit 28 conditions air and supplies the air to the air duct ventilation system 24C. In embodiments, the ventilation air handling unit 28 comprises a heat pump air handling unit. The ventilation air handling unit 28 provides a high level of filtration to ensure superior air quality throughout the insulated shell and within each apartment or unit. Depending on outdoor conditions the ventilation air is cooled or heated by the ventilation air handling unit 28 so as to be distributed at a neutral temperature. During cooling the ventilation air handling unit 28 dehumidifies ventilated air to a very low dewpoint by mechanical sub-cooling with reheat or by desiccant dehumidification. In some embodiments, the ventilation air handling unit 28 comprises an enthalpy recovery heat exchanger for receiving exhaust air therethrough to precondition the air entering from the outside and thereby reducing the conditioning load and energy consumption at the ventilation air handling unit 28.

Figure 5:
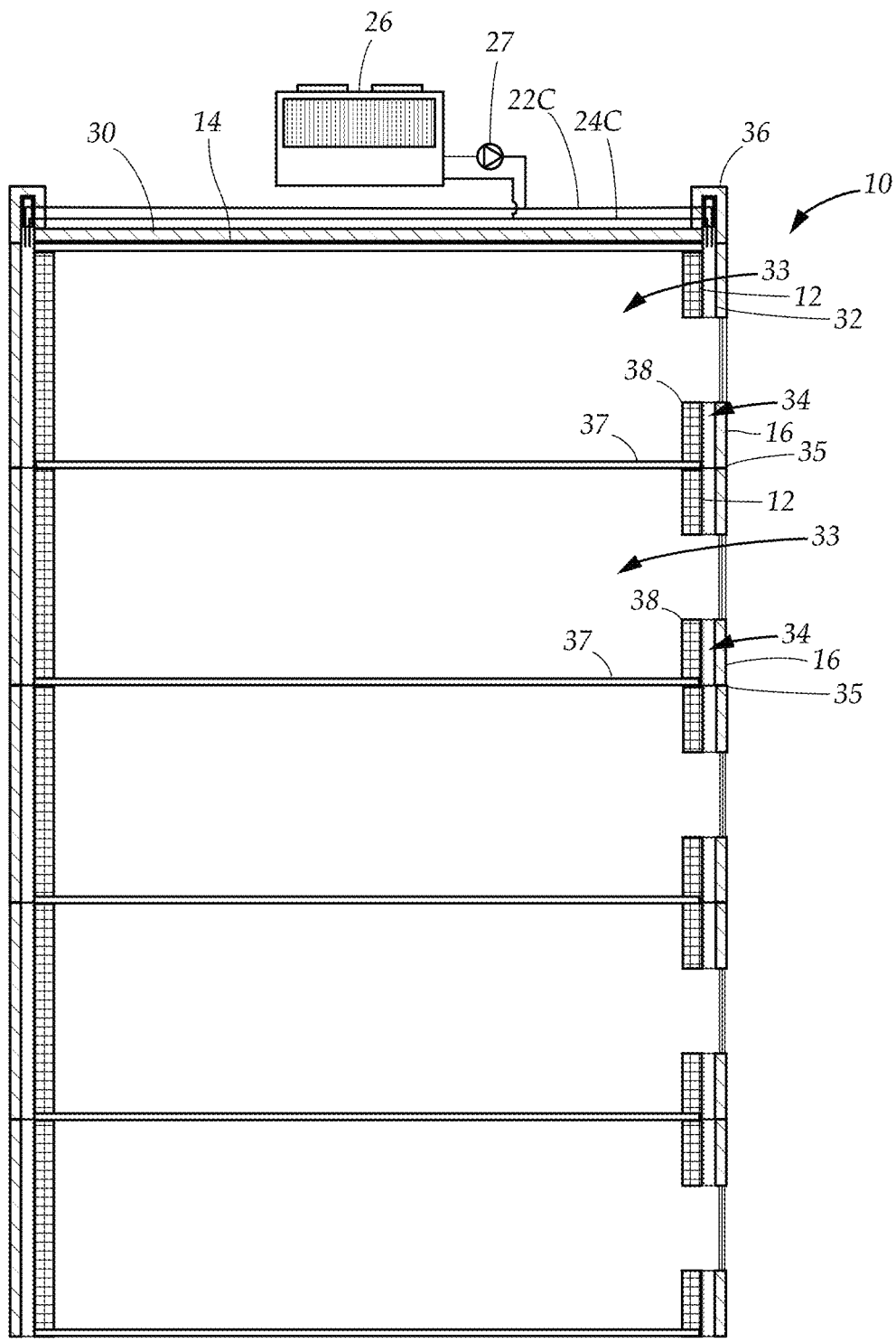
FIG. 5 is a cross-sectional view of a building in which the facade panel conditioning system has been fully installed on a building, illustrating a cross-section of the modular panels of the facade panel conditioning system along the exterior of the building according to one embodiment of the present disclosure.

Referring now to FIG. 5, each of the plurality of modular panels 16 of the facade panel conditioning system 10 is in communication with the hydronic heat pump system 26. The hydronic heat pump system 26 includes a water circulation pump 27 for circulating water throughout the hydronic heat pump system 26. The comprises an anchor 35 which fixedly attaches each of the plurality of modular panels 16 to the structure 37 of the building 14. The structure 37 comprises any structural component of the building 14 such as a structural slab, beam, and column. When installed over an existing facade, the anchor 35 attaches to the structure 37 of the building 14 such that the panel juts out from the exterior 12, thereby forming an air cavity 34 between the plurality of modular panels 16 and the exterior 12 of the building 14.

In embodiments, the air cavity 34 is 6 to 12 inches in width, i.e., the distance between the wall of the exterior 12 of the building 14 and the modular panel is 6 to 12 inches. In some embodiments, the air cavity 34 is 6 to 8 inches in width. In other embodiments, the air cavity 34 is 10 to 12 inches in width. In embodiments, the insulated shell 32 is completed at the roof 30. The insulated shell 32 extends vertically past the roof 30 to form a new parapet 36 having insulation that fully encloses and insulates the shell 32 on the exterior 12.

In embodiments, when installed on an existing building, once the insulated shell 32 is formed around the building 14, a user removes the existing windows of the individual units 33 of the building 14 to receive heat and air from the hydronic piping system 22C and the air duct ventilation system 24C within the shell 32. Next, a user optionally removes the existing insulation of the wall 38 of the individual units 33 of the building 14 that corresponds to the facade of the individual unit 33 to maximize heat transfer from the hydronic piping system 22C to the air cavity 34 and individual unit 33. Next, the user seals off the air cavities 34 from the individual units 33, for example, by sealing the window opening, formed by removing the windows, with gypsum board or similar material. Finally, a user optionally removes any of the existing HVAC system components such as piping, radiators and air conditioning units from the individual unit 33.

Figure 6:
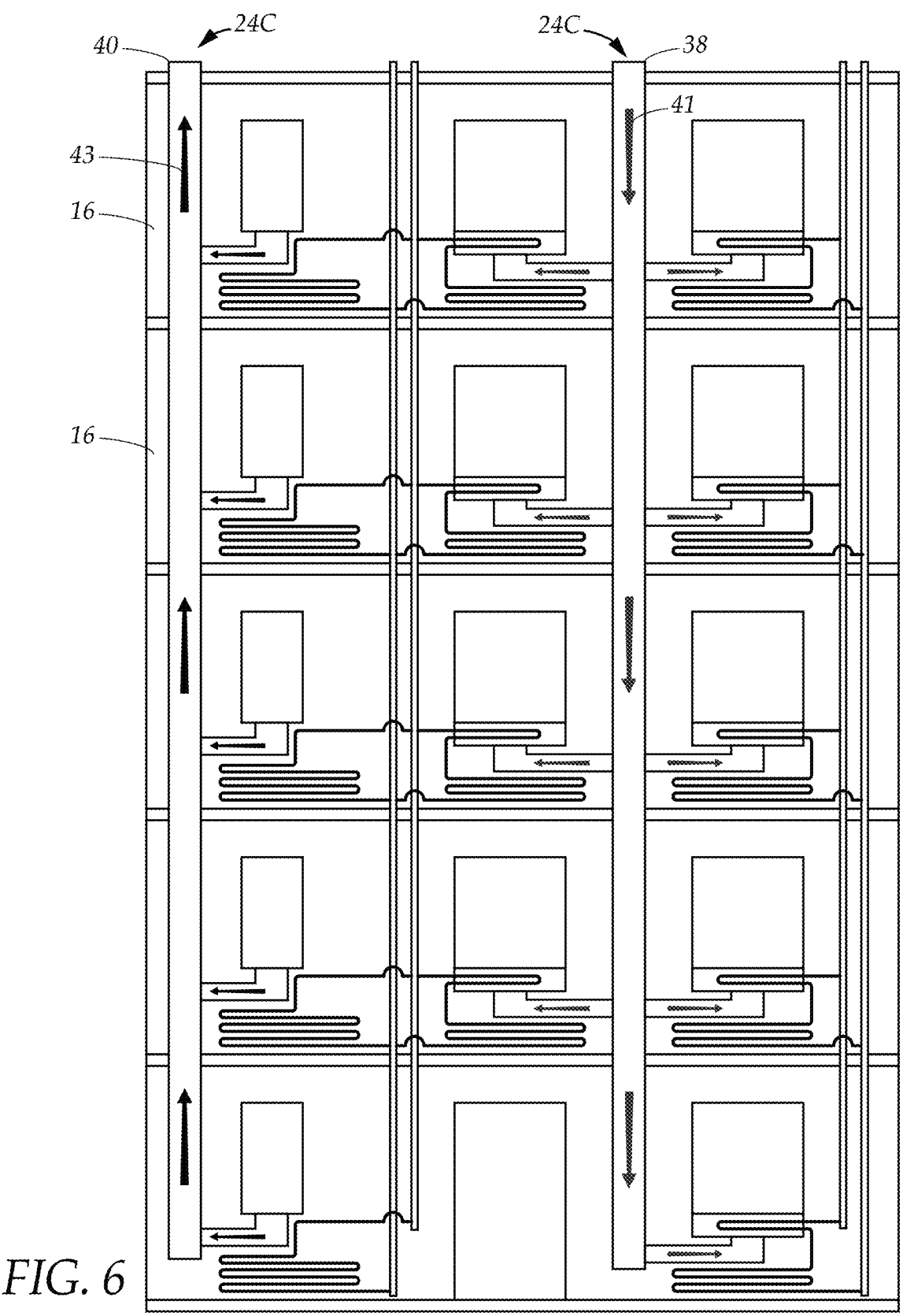
FIG. 6 is a schematic view of an assembled facade panel conditioning system, illustrating the distribution of the HVAC piping and ductwork of the facade panel conditioning system throughout the building and to the individual units of the building according to one embodiment of the present disclosure.
Figure 7:
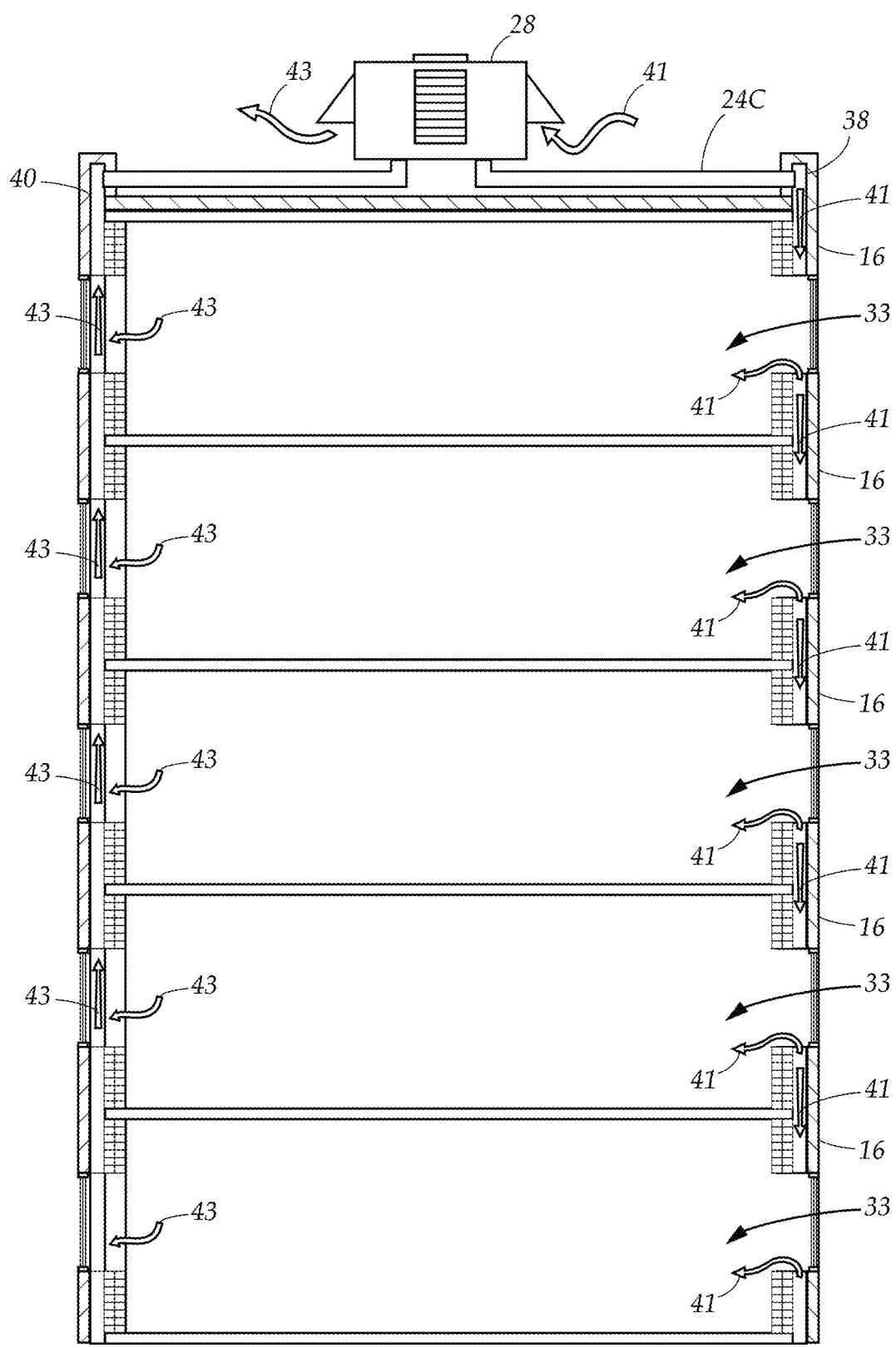
FIG. 7 is a cross-sectional view of a building in which the facade panel conditioning system has been fully installed on a building, illustrating a cross-section of the modular panels of the facade panel conditioning system along the exterior of the building and the air duct ventilation system formed by the network of modular facade panels installed over the exterior of the building according to one embodiment of the present disclosure.

Referring now to FIG. 6 and FIG. 7, the air duct ventilation system 24C is coupled to the ventilation air handling unit 28 and includes an air supply riser 38 and an air exhaust riser 40. While the airtight and watertight seal of the insulated shell creates the desired effect of reducing heating and cooling loads and improved comfort, the seal necessitates the provision of mechanically supplied ventilation air to maintain excellent indoor air quality within the individual units. Accordingly, the supply riser 38 distributes air 41 to each of the individual units 33 corresponding to each of the plurality of modular panels 16, while the exhaust riser 40 removes exhaust air 43 from each of the individual units 33 to ensure a neutral or slightly positive air pressure. The quantity of air required at each apartment is low enough that the air duct ventilation system 24C can be positioned within the air cavity.

Referring now to FIG. 8A, FIG. 8B, and FIG. 8C, each of the plurality of modular panels 16 comprises an interior surface 42, an exterior surface 44, a first side 46, a second side 48, an upper end 50, and a lower end 52. The first side 46 and the second side 48 are separated by the window assembly 20. The upper end 50 and the lower end 52 are also separated by the window assembly 20. The window assembly 20 may comprise one or more separate and distinct windows. In embodiments, the window assembly 20 is disposed centrally along a longitudinal axis of the plurality of modular panels 16 and offset toward the upper end 50 of the plurality of modular panels 16. In some embodiments, the window assembly 20 comprises a triple pane window to increase an insulation R-value of the window assembly 20 of each of the plurality of modular panels 16. In embodiments, the window assembly comprises a window that produces an R-value of 3 $ft^{2.\circ}$ F.·h/BTU to 10 $ft^{2.\circ}$ F.·h/BTU.

The lower end 52 of each of the plurality of modular panels 16 defines an interior volume comprising the insulation 18. In embodiments, the insulation 18 comprises any known insulative material or combination of insulative materials and insulative layering that produces an R-value of 10 $ft^{2.\circ}$ F.·h/BTU to 40 $ft^{2.\circ}$ F.·h/BTU. For example, in one embodiment, the insulation 18 comprises a foam layered between a metallic panel. In embodiments, the plurality of modular panels 16 are prefabricated, enabling delivery directly to a project site for quick installation and minimal disruption to tenants or owners within the building. Each of the plurality of modular panels 16 may be manufactured in various configurations including different shapes and sizes so as to be installed on any new or existing building facade. In some embodiments, the exterior surface 44 may include any variety of known materials, patterns, and/or colors to allow for a wide range of designs on the exterior surface for architectural expression. For example, in embodiments, the exterior surface may comprise, wood planks, sculpted fiber glass, metal panels, cement board, molded polycarbonate, fiberglass, or polycarbonate. In other embodiments, the exterior surface 44 comprises exterior window shading, lighting, and/or building integrated photovoltaics.

The air cavity 34 comprises a first side 53, a second side 55, an upper end 57, and a lower end 59. The first side 53 and the second side 55 are separated by the window assembly 20. The upper end 57 and the lower end 59 are also separated by the window assembly 20. In embodiments, the air cavity 34 is utilized for routing other utilities such as low voltage communication wiring or power conduits.

The hydronic piping 22 and the air duct 24 of each of the modular panels of the plurality of modular panels 16 are disposed within the air cavity 34. The hydronic piping 22 comprises a supply riser 54, a return riser 56, and air cavity supply piping 58. The supply riser 54 and the return riser 56 are part of the larger hydronic piping system and configured to deliver heat throughout the insulated shell and building 14. The air cavity supply piping 58 is configured to transfer heat directly to each respective individual air cavity 34. In embodiments, the hydronic piping 22 is uninsulated to allow for heat transfer directly to the air cavity 34.

In embodiments, the supply riser 54 and the return riser 56 are positioned within the first side 53 of the air cavity 34 adjacent to the first side 46 of the plurality of modular panels 16. The air cavity supply piping 58 is positioned within the lower end 59 of the air cavity 34 adjacent to the lower end 52 of the plurality of modular panels 16. The air cavity supply piping 58 is coplanar with the supply riser 54 and the return riser 56. The air cavity supply piping 58 extends outwardly from the supply riser 54 into a first area of the lower end 59 of the air cavity 34, through the lower end 59 of the air cavity 34, and back to the return riser 56 from a second area of the lower end 59 of the air cavity 34. The air cavity supply piping 58 is arranged in a series of rows so as to increase the area of the air cavity supply piping 58 within the air cavity 34. In some embodiments, the air cavity supply piping 58 is attached to the interior surface 42 of the plurality of modular panels 16 at the lower end 52 of the plurality of modular panels 16. In other embodiments, the air cavity supply piping 58 comprises a finned surface 61 to allow for additional heat transfer to the air cavity 34.

In operation, as heated water circulates through the hydronic piping 22 the air within the air cavity 34 rises in temperature. The rise in temperature within the air cavity 34 subsequently raises the temperature of the interior wall of the unit 33 to act as a radiant heating surface to the interior of the unit 33. During cooling, chilled water produces a similar radiant cooling effect.

The air duct 24 comprises an air supply/exhaust riser 60 and an air cavity supply/exhaust branch duct 62. In some embodiments, the air supply/exhaust riser 60 is an air supply riser or an air exhaust riser. The air cavity supply/exhaust branch duct 62 is configured to deliver a ventilated air stream directly to the air cavity 34.

In embodiments, the air supply/exhaust riser 60 is positioned within the second side 55 of the air cavity 34 adjacent to the second side 48 of the plurality of modular panels 16. The air cavity supply/exhaust branch duct 62 is positioned within the lower end 59 of the air cavity 34 adjacent to the lower end 52 of the plurality of modular panels 16. The air cavity supply/exhaust branch duct 62 is coplanar with the air supply/exhaust riser 60. The air cavity supply/exhaust branch duct 62 extends outwardly from the air supply/exhaust riser 60 into the lower end 59 of the air cavity 34. In embodiments, the supply riser 54, the return riser 56, and the air supply/exhaust riser 60 extend parallel relative to each other within the air cavity 34. In some embodiments, the air cavity supply/exhaust branch duct 62 comprises a portion of the air cavity supply piping 58 within an interior of the branch duct 62 to provide additional heating or cooling capacity to the ventilated air stream. In other embodiments, the air cavity supply/exhaust branch duct 62 comprises a balancing damper 64 to regulate the ventilated air stream to the air cavity 34 and throughout the insulated shell.

Each of the plurality of modular panels 16 also comprises a hydronic box 68 including a recessed enclosure 69 having a hydronic coil 65, an air supply diffuser 70 including return air inlets 79, an air supply booster fan 71, a return air separation baffle 73, and an access door 75. The hydronic box 68 protrudes outwardly from a lower end 66 of the window assembly 20. In embodiments, the hydronic box 68 is attached to the lower end 66, immediately below the window of the window assembly 20, serving as a new windowsill or part of the old windowsill after installation. In other embodiments, the hydronic box 68 can be oriented vertically and attached to either side of the window assembly 20. The heat and air from the hydronic piping 22 and the air duct 24 enter the individual units 33 through the hydronic box 68. The hydronic box 68 is coupled to the air cavity supply/exhaust branch duct 62 to broaden the air supply from the air cavity supply/exhaust branch duct 62 to the individual units 33. In embodiments, the hydronic piping 22 comprises a valve 39 disposed within the hydronic box 68 to adjust the water flow of the hydronic piping 22 to provide the required amount of heating or cooling as indicated by a thermostat within an individual unit 33. The valve 39 is located such that it is easily accessible from within the individual unit 33. In some embodiments, the valve 39 is coupled to the air cavity supply piping 58 or the hydronic coil 65 and accessible via an access door in the hydronic box 68. The air supply booster fan 71 may either be a linear fan or an axial fan.

In embodiments, the hydronic coil 65 is piped in series, or forms a part of, the air cavity supply piping 58 to provide additional heating or cooling capacity to the ventilated air stream. For example, in embodiments, the air cavity supply piping 58 extends outwardly from the supply riser 54 directly into the hydronic box 68 and then out of the hydronic box 68 to the first area of the lower end 59 of the air cavity 34. Note, the portion of the air cavity supply piping 58 that is disposed within the hydronic box 68, or extends through the hydronic box 68, is the hydronic coil 65. The hydronic coil 65 is arranged in a series of rows so as to increase the area of the hydronic coil within the hydronic box 68. The hydronic coil 65 comprises a finned surface 61 to allow for additional heat transfer to the recessed enclosure 69. In embodiments, the plurality of panels 16 also comprise condensate disposal risers or pumps for removing condensation formed in the hydronic box 68 and/or hydronic coil 65. In other embodiments, the system does not form condensate and no means of condensate disposal are required.

In embodiments, the hydronic piping 22 includes a single supply riser 54 and a single return riser 56 each circulating either heated or chilled water. In other embodiments, the hydronic piping includes two supply risers 54 and two return risers 56, wherein one of the supplies risers 54 or the return risers 56 is dedicated to heated water and the other is dedicated to chilled water, and includes valves within the hydronic box 68 to select between the heated water and the chilled water.

In operation, capacity can be enhanced by increasing the air flow of the ventilated air stream over the hydronic coil 65 by inducing recirculated room air via the air supply booster fan 71 to mix with the ventilated air stream prior to contact with the hydronic coil 65.

In operation, the ventilation air stream is supplied to each unit 33 at neutral temperature and very low moisture levels to meet any latent cooling loads within the air cavity and/or unit and ensure that the dewpoint within the unit is low enough such that condensation will not form on chilled surfaces. The air cavity supply/exhaust branch duct 62 delivers a small amount of air directly to the air cavity 34 for the same purpose of preventing condensation on chilled hydronic piping 22 as well as maintaining a slight positive pressurization within the air cavity 34 to prevent any air infiltration from outdoors.

In operation, the insulated shell formed by the modular attachment of the plurality of modular panels 16 reduces the heating and cooling loads to such low levels that the radiant heating and cooling effect from the air cavities 34 combined with the added capacity produced by the hydronic coil 65 to heat and cool the ventilation air stream are sufficient to meet the entire heating and cooling load within an individual unit 33.

In embodiments, the anchor 35 is disposed on the upper end 50 of the plurality of modular panels 16. The anchor 35 extends orthogonally outwardly relative to the interior surface 42 of the plurality of modular panels 16. In this way, when the anchor 35 attaches to the structure 37 of the building 14, the plurality of modular panels 16 jut out from the exterior 12 and align parallelly with the exterior 12, thereby forming the air cavity 34 between the plurality of modular panels 16 and the exterior 12 of the building 14. In other embodiments, the anchor 35 may comprise a first anchor disposed on the upper end 50 of the plurality of modular panels 16 and a second anchor disposed on the lower end 52 of the plurality of modular panels 16.

In embodiments, each of the plurality of modular panels 16 comprises an air cavity isolation baffle 72 that separates the air cavity 34 of a modular panel of the plurality of modular panels 16 from the air cavity 34 of an adjacent modular panel of the plurality of modular panels 16. In effect, the air cavity isolation baffle 72 prevents migration of air, fire, and smoke horizontally or vertically in between adjacent modular panels when the plurality of modular panels 16 are attached to the exterior 12 of the building 14. The sealant (not shown) is applied around the air cavity isolation baffle 72 to ensure an airtight seal between adjacent modular panels. In some embodiments, the air cavity isolation baffle 72 is disposed between the air cavity supply piping 58 and the second anchor 35B. In other embodiments, each of the plurality of modular panels 16 comprises an insulated board 77 for mounting the hydronic piping 22 and the air duct 24 onto the plurality of panels 16.

The present disclosure also provides a method for installing the facade panel conditioning system over the exterior 12 of a new or existing building 14. In embodiments, the method comprises anchoring the plurality of modular facade panels 16 to the structure 37 of the building 14, such that each of the plurality of modular facade panels 16 corresponds to the exterior 12 of an individual unit 33 of the building 14 and the air cavity 34 is formed between the exterior 12 of the individual unit 33 and a corresponding modular facade panel. When installed on an existing building, each of the plurality of modular facade panels 16 are anchored to the structure 37 of the building 14 such that the window assembly 20 of a modular panel of the plurality of modular facade panels 16 corresponds in dimension and location to the original window of the individual unit of the building 14 to which the modular panel was anchored.

In embodiments, the method further comprises connecting the hydronic piping 22 of adjacent anchored modular facade panels to form a hydronic piping system that distributes heat throughout air cavities 34 of the plurality of modular facade panels 16 and connecting the air ducts 24 of adjacent anchored modular facade panels to form an air duct ventilation system that distributes air throughout the air cavities 34 of the plurality of modular facade panels 16. In some embodiments, the method comprises sealing adjacent anchored modular facade panels of the plurality of modular panels 16 to create the insulated shell around the building 14.

In embodiments, when installed on an existing building, the method further comprises removing the existing windows 31 of the individual units 33 of the building 14 and removing the existing insulation of the interior wall of the individual units 33 of the building 14 that corresponds to the exterior 12 of the individual unit 33. In some embodiments, the method includes making interior finishes within the individual unit 33 to optimize for radiant heat transfer to the individual unit 33 and thermal comfort within the individual unit 33. In certain embodiments, the method includes removing the existing HVAC system components, such as piping, radiators and air conditioning units, from the individual unit 33.

In embodiments, when installed on a new building, each of the plurality of modular facade panels 16 may include a finished interior wall assembly, including components such as baseboards and electrical outlets to minimize the amount of interior finishing work required after panel installation.

Figure 9:
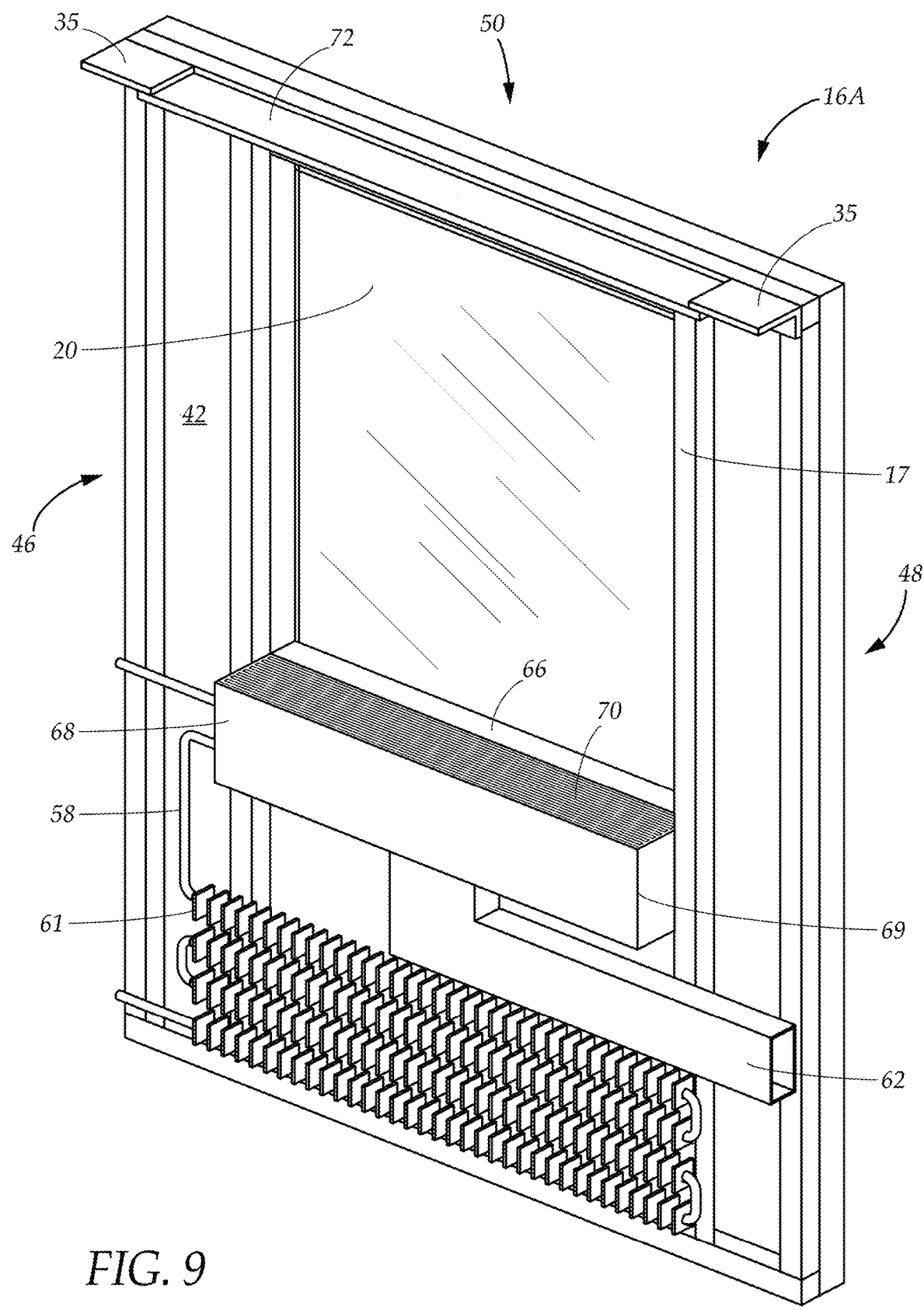
FIG. 9 is a perspective view of a modular panel of the facade panel conditioning system, illustrating the configuration of the components of the modular panel according to one embodiment of the present disclosure.
Figure 12:
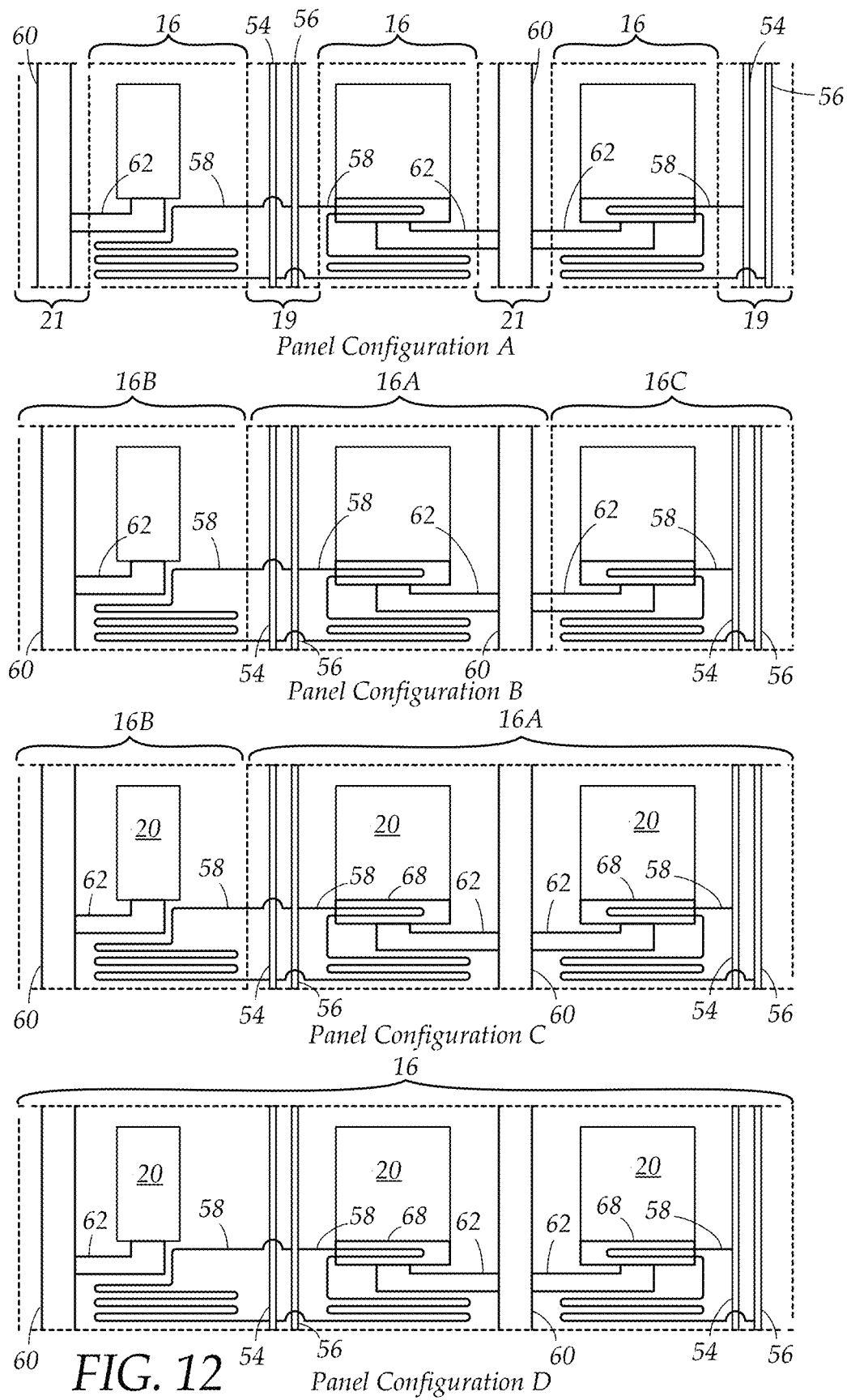
FIG. 12 is an elevation view of several different panel configurations of the modular panel of the facade panel conditioning system, illustrating the components of each individual modular panel of each of the panel configurations and the relative orientation of each modular panel and its components with respect to adjacent modular panels when modularly attached to the exterior of a building according to one embodiment of the present disclosure.

Referring now to FIG. 9 and FIG. 12, with reference FIG. 8C, any of the plurality of panels 16 may be prefabricated without the supply riser 54, the return riser 56, and the air supply/exhaust riser 60. Note, some panels of the plurality of panels 16 may be prefabricated as such, while other panels of the plurality of panels 16 are prefabricated in different configurations. For example, in embodiments, the plurality of panels 16 may include only the window assembly 20, the air cavity supply piping 58, the air cavity supply/exhaust branch duct 62, the hydronic box 68, one anchor 35, and the air cavity isolation baffle 72. In some embodiments, each of the plurality of panels 16 comprises support framing 17 attached to the interior surface 42 of the panel 16. The support framing reinforces the structural integrity of the panels 16 and facilitates the mounting of the various components of the panels. In embodiments, the anchor 35 comprises a pair of L-brackets, in which a first L-bracket is disposed on the first side 46 of the panel 16 and a second L-bracket is disposed on the second side 48 of the panel 16. The air cavity isolation baffle 72 extends across the upper end 50 of the panels 16. The air cavity isolation baffle 72 may be attached to the anchor 35. For example, in some embodiments, the air cavity isolation baffle 72 extends from the first L-bracket to the second L-bracket spanning a majority of the length of the upper end 50.

Note, in the following panel configurations, the panels are demarcated by broken lines. Panel configuration A shows an example panel configuration in which a plurality of panels 16, not including the supply riser 54, the return riser 56, and the air supply/exhaust riser 60 have been modularly attached to the facade of a building. In configuration A, the supply riser 54 and the return riser 56 are provided separately in a supply/return riser panel 19 and the air supply/exhaust riser 60 is provided separately in an air supply/exhaust riser panel 21. The supply/return riser panel 19 and the air supply riser panel 21 placed in between adjacent panels 16 such that the supply/return riser panel 19 may connect to the air cavity piping 58 of the adjacent panels and the air supply riser panel 21 may connect to the supply/exhaust branch duct 62 of the adjacent panels 16. In this way, all modularly attached panels 16 have the piping and ductwork necessary to supply heat and air to the individual units 33. The supply/return riser panel 19 and the air supply riser panel 21 may attach to the facade of the building itself or to the adjacent panels 16.

In embodiments, any of the plurality of panels 16 may be prefabricated to either include the supply riser 54, the return riser 56, the air supply/exhaust riser 60, or any combination of the same. Panel configuration B shows an example in which a plurality of panels 16, some including either the supply riser 54 and the return riser 56 or the air supply/exhaust riser 60, or all of the same have been modularly attached to the facade of a building. In panel configuration B, a first panel 16A including the supply riser 54, the return riser 56, and the air supply/exhaust riser 60 is positioned between two panels, a second panel 16B including only the air supply/exhaust riser 60 and a third panel 16C including only the supply riser 54 and the return riser 56. Panel 16A is positioned such that the supply riser 54 and the return riser 56 of panel 16A is posited adjacent to panel 16B and the air supply/exhaust riser 60 is positioned adjacent to panel 16C. In this way, the air cavity supply piping 58 of panel 16B may connect to the supply riser 54 and the return riser 56 of panel 16A and the supply/exhaust branch duct 62 of panel 16C may connect to the air supply/exhaust riser 60 of panel 16A to establish the necessary piping and ductwork necessary to provide heat and air to each individual unit 33. Indeed, individual units 33 may share the piping and ductwork that provides heat and air thereto.

In some embodiments, any of the plurality of panels 16 may be prefabricated to include multiple windows 20, supply risers 54, return risers 56, air supply/exhaust risers 60, air cavity supply piping 58, air cavity supply/exhaust branch ducts 62, and hydronic boxes 68. Panel configuration C shows an example in which a pair of panels 16 including a first panel 16A having a pair of windows 20, a pair of supply risers 54, a pair of return risers 56, an air supply/exhaust riser 60, a pair of air cavity supply piping 58, a pair of air cavity supply/exhaust branch ducts 62, and a pair of hydronic boxes 68 and a second panel 16B a window 20, an air supply/exhaust riser 60, air cavity supply piping 58, an air cavity supply/exhaust branch duct 62, and a hydronic box 68 have been modularly attached to the facade of a building. In panel configuration C, panel 16A has been configured to span a larger individual unit 33 or two separate individual units 33. Panel 16B may be placed on either side of Panel 16A such that the air cavity supply piping of panel 16B connects to either of the supply risers 54 or return risers 56 to establish the necessary piping and ductwork necessary to provide heat and air to each individual unit 33. Panel configuration D shows an example in which one panel 16 includes a plurality of windows 20, a pair of supply risers 54, a pair of return risers 56, a pair of air supply/exhaust riser 60, a plurality of air cavity supply piping 58, a plurality of air cavity supply/exhaust branch ducts 62, and a pair of hydronic boxes 68. In panel configuration D, the panel 16 has been configured to span an even larger individual unit 33 or more than two separate individual units 33. Indeed, depending on the size of the building and the span of the individual units 33 of the building, the plurality of modular panels 16 may be fabricated according to either or any combination of panel configuration A-D.

Figure 10:
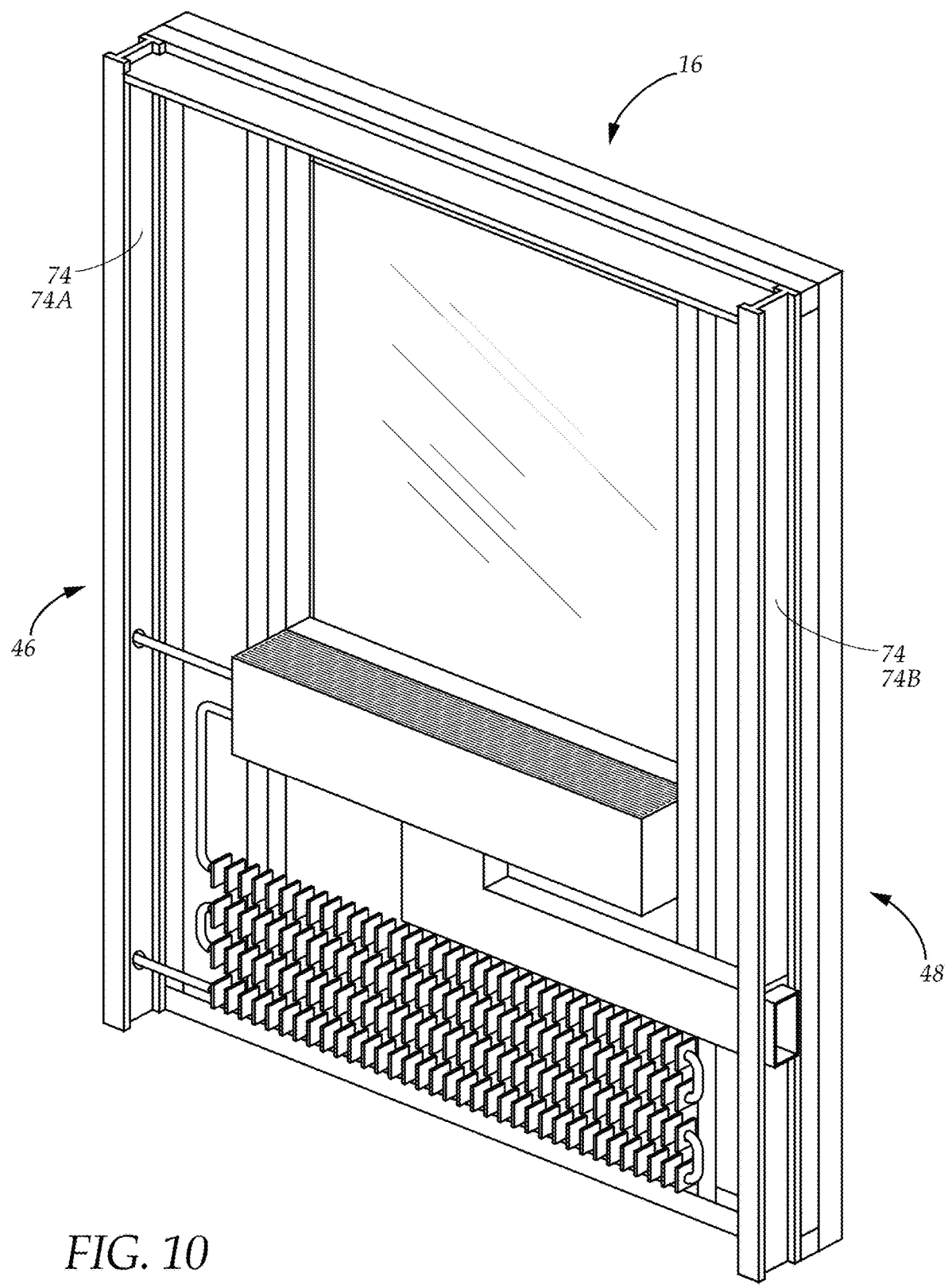
FIG. 10 is a perspective view of a modular panel of the facade panel conditioning system, illustrating the configuration of the components of the modular panel according to another embodiment of the present disclosure.

FIG. 10 shows an alternative embodiment of the panels 16. The panels 16 in some embodiments, may comprise a vertical rail support system 74 rather than a structural anchor. The vertical rail support system 74 may include a pair of rail support risers 74A, 74B extending vertically along the length of the first side 46 and vertically along the length of the second side 48, respectively, of the panel 16. The rail support risers 74A, 74B may be attached to the panels 16 or come prefabricated as part of the panels 16. In embodiments, the vertical rail support system 74 is attached to the exterior of the new or existing building in a network of rail support risers extending over the building and then the panels 16 are modularly attached or tied into the vertical rail support risers. The rail support risers 74A, 74B may comprise beams such as, I-beams, T-bars, L-angles, wide flange beams, channeled beams, or rectangular beams.

Figure 11:
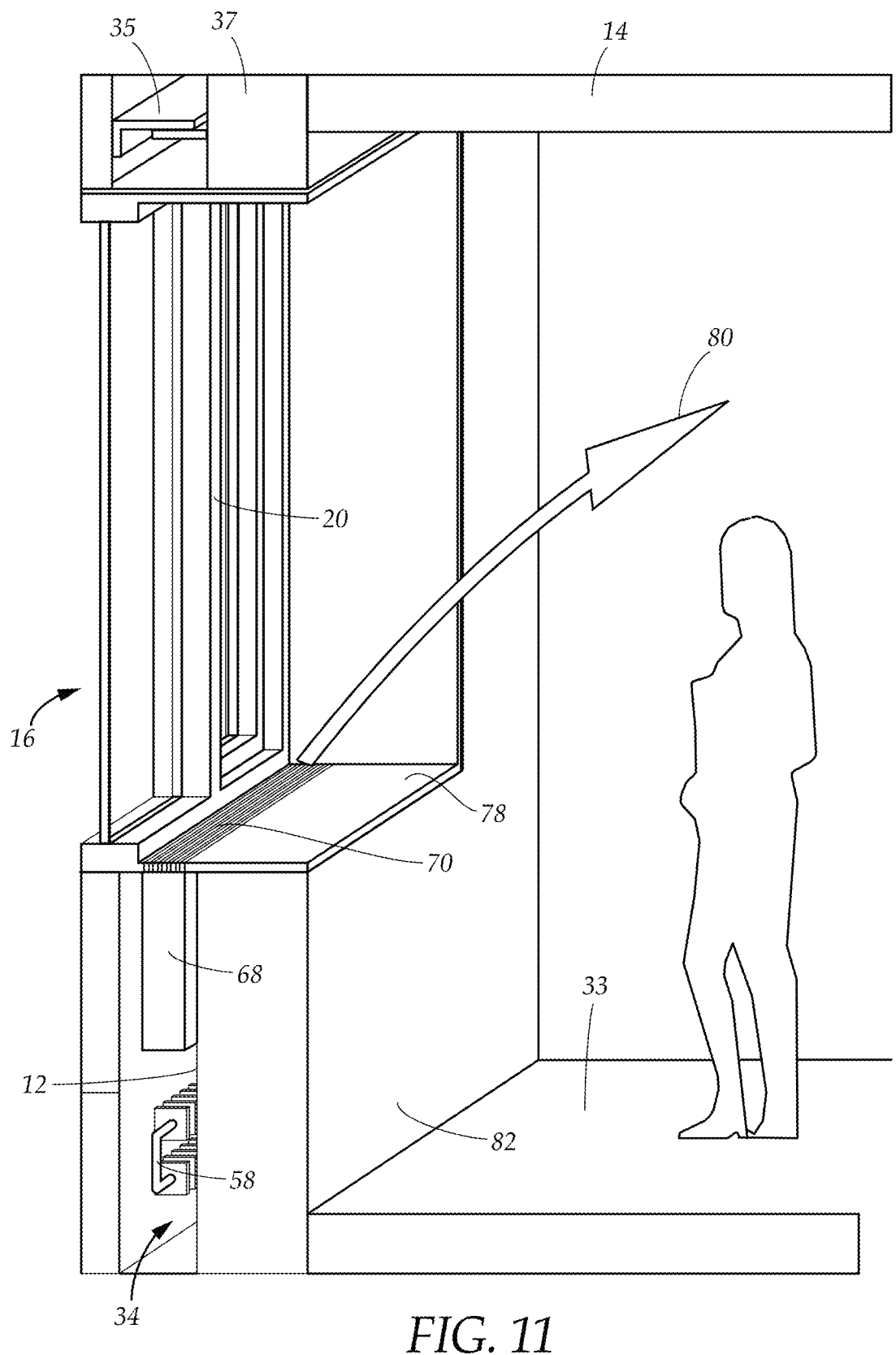
FIG. 11 is a cross-sectional view of an apartment unit of a building having a modular panel of the facade panel conditioning system mounted to the exterior of the building, illustrating the relative orientation and positioning of the panel and its components with respect to the exterior of the building as well as the way in which heated or cooled air is distributed to the apartment unit according to one embodiment of the present disclosure.

FIG. 11 shows the three-dimensional orientation of a panel 16 with respect to an individual unit 33 of a building 14 when the panel 16 mounted thereon. In embodiments, the anchor 35 attaches to the structure 37 of the building 14 such that the panel 16 juts out from the exterior 12. The panel 16 spans the height and width of individual unit 33 and/or the area of the exterior 12 of the building 14 that corresponds to the individual unit 33. The air cavity 34 is formed between panel 16 and the exterior 12 of the building 14. The hydronic box 68 and the air cavity supply piping 58 are positioned within the air cavity 34. The air supply diffuser 70 of the hydronic box 68 spans the area between the window assembly 20 and the windowsill 78 of the individual unit 33 to seal off the unit 33 from the air cavity 34. The hydronic box blows air 80 through the air supply diffuser 70 into the unit 33 to heat or cool the unit 33. The air cavity supply piping 58 raised the temperature of the air cavity 34, which in turn raises the temperature of the interior wall 82 of the unit 33, such that the air cavity supply piping 58 serves as a radiant heat source to the unit 33.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a facade panel conditioning system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A facade panel conditioning system for installation over an exterior wall of a new or existing building, comprising:
 a plurality of modular panels configured to modularly attach to one another over the exterior wall of the new or existing building to form an insulated shell that encloses the exterior wall, each of the plurality of modular panels comprising insulation, a window assembly, an interior surface, an exterior surface, a first side and a second side separated by the window assembly, and an upper end and a lower end separated by the window assembly;

an anchor configured to fixedly attach each of the plurality of modular panels to the structure of the building to form an air cavity between the modular panel and the exterior wall of the building, the air cavity comprising a first side and a second side separated by the window assembly, and an upper end and a lower end separated by the window assembly;

hydronic piping disposed within the air cavity configured to transfer heat to the air cavity, the hydronic piping comprising a supply riser and a return riser configured to distribute heat throughout the insulated shell and air cavity supply piping configured to transfer heat to the air cavity;

an air duct disposed within the air cavity configured to deliver ventilated air to the air cavity, the air duct comprising an air supply/exhaust riser configured to distribute ventilated air throughout the insulated shell and an air cavity supply/exhaust branch duct configured to deliver a ventilated air stream to the air cavity, the supply riser and the return riser positioned within the first side of the air cavity adjacent to the first side of the plurality of modular panels, the air supply/exhaust riser positioned within the second side of the air cavity adjacent to the second side of the air cavity, the supply riser, the return riser, and the air supply/exhaust riser extending parallel relative to each other within the air cavity;

an air cavity isolation baffle disposed on each of the modular panels, the air cavity isolation baffle extending continuously across the modular panel and protruding outwardly with respect to the modular panel, the air cavity isolation baffle separating the air cavity of a modular panel of the plurality of modular panels from the air cavity of an adjacent modular panel of the plurality of modular panels when the plurality of modular panels are attached to the building to prevent migration of air, fire, and smoke horizontally or vertically in between adjacent modular panels; and a sealant configured to seal the plurality of modular panels to one another when attached to the building to create an airtight and watertight seal between an interior of the plurality of modular panels and an exterior of the plurality of modular panels;

wherein:

the hydronic piping of a modular panel of the plurality of modular panels connects to the hydronic piping of an adjacent modular panel of the plurality of modular panels when the plurality of modular panels are attached to the building to form a hydronic piping system that distributes heat throughout the insulated shell and the building; and the air duct of a modular panel of the plurality of modular panels connects to the air duct of an adjacent modular panel of the plurality of modular panels when the plurality of modular panels are attached to the building to form an air duct ventilation system including a network of interconnected air ducts extending vertically along the exterior wall of the building that distributes air throughout the insulated shell and the building.

2. The facade panel conditioning system of claim 1, wherein:

the window assembly is disposed centrally along a longitudinal axis of the plurality of modular panels offset towards the upper end of the plurality of modular panels;

the air cavity supply piping is positioned within the lower end of the air cavity adjacent to the lower end of the plurality of modular panels; and the air cavity supply/exhaust branch duct is positioned within the lower end of the air cavity adjacent to the lower end of the plurality of modular panels.

3. The facade panel conditioning system of claim 2, wherein:

the air cavity supply piping is coplanar with the supply riser and the return riser; and the air cavity supply piping extends outwardly from the supply riser into a first area of the lower end of the air cavity, through the lower end of the air cavity, and back to the return riser from a second area of the lower end of the air cavity.

4. The facade panel conditioning system of claim 3, wherein:

the air cavity supply/exhaust branch duct is coplanar with the air supply/exhaust riser; and the air cavity supply/exhaust branch duct extends outwardly from the air supply/exhaust riser into the lower end of the air cavity.

5. The facade panel conditioning system of claim 4, wherein the air cavity supply piping is attached to the interior surface of the plurality of modular panels at the lower end of the plurality of modular panels.

6. The facade panel conditioning system of claim 4, each of the plurality of modular panels comprises a hydronic box including a recessed enclosure having a hydronic coil and an air supply diffuser, the hydronic box coupled to the air cavity supply/exhaust branch duct to broaden the air supply from the air cavity supply/exhaust branch duct, the air cavity supply piping extending from the supply riser into the hydronic box and then out of the hydronic box to the first area of the lower end of the air cavity.

7. The facade panel conditioning system of claim 6, wherein the hydronic box further comprises an air supply booster fan, a return air separation baffle, and an access door, the hydronic box protruding outwardly from a lower end of the window assembly.

8. The facade panel conditioning system of claim 6, wherein the window assembly comprises a double pane window or a triple pane window to increase an R-value of the window assembly of each of the plurality of modular panels.

9. The facade panel conditioning system of claim 6, wherein the air cavity supply piping comprises a finned surface to allow for additional heat transfer to the air cavity.

10. The facade panel conditioning system of claim 6, wherein the air cavity supply/exhaust branch duct comprises:

a portion of the air cavity supply piping to provide additional heating or cooling capacity to the ventilated air stream; and a balancing damper to regulate the ventilated air flow throughout the insulated shell.

11. The facade panel conditioning system of claim 6, wherein the anchor comprises an anchor disposed on the upper end of the plurality of modular panels, the anchor extending outwardly relative to the interior surface of the plurality of modular panels.

12. The facade panel conditioning system of claim 6, wherein each of the lower ends of the plurality of modular panels define an interior volume comprising the insulation.

13. The facade panel conditioning system of claim 12, wherein the insulation comprises an R-value of 10 $ft^{2\cdot \circ}F\cdot h/BTU$ to 40 $ft^{2\cdot \circ}F\cdot h/BTU$.

14. The facade panel conditioning system of claim 6, wherein the air cavity formed between the modular panel and the facade of the new or existing building is 6 to 12 inches.

15. A method for installing a facade panel conditioning system over the exterior of an existing building, comprising:
- anchoring a plurality of modular facade panels including a window assembly, hydronic piping, and air ventilation duct to the structure of an existing building, such that each of the plurality of facade panels corresponds to the facade of an individual unit of the existing building and an air cavity is formed between the exterior wall of the individual unit and a corresponding modular facade panel;
- connecting the hydronic piping of adjacent anchored modular facade panels to form a hydronic piping system that distributes heat throughout the plurality of modular facade panels;
- connecting the air ventilation ducts of adjacent anchored modular facade panels to form an air duct ventilation system that distributes air throughout the plurality of modular facade panels;
- sealing adjacent anchored modular facade panels of the plurality of modular panels to create an insulated shell around the existing building;
- removing the windows of the individual units of the existing building;
- connecting the hydronic piping system to a hydronic heat pump to operate the hydronic piping system; and
- connecting the air duct ventilation system to a ventilation air handling unit to operate the air duct ventilation system, wherein each of the plurality of modular facade panels are anchored to the structure of the existing building such that the window assembly of a modular panel of the plurality of facade panels corresponds in dimension and location to the window of the individual unit of the existing building to which the modular panel was anchored.

* * * * *